United States Patent [19]

Alfemess et al.

[11] Patent Number: 4,737,007

[45] Date of Patent: Apr. 12, 1988

[54] NARROW-BAND WAVELENGTH SELECTIVE OPTICAL COUPLER

[75] Inventors: Rodney C. Alferness, Holmdel; Matthew S. Whalen, Rumson, both of N.J.

[73] Assignee: American Telephone and Telegraph Company, AT&T Bell Laboratories, Murray Hill, N.J.

[21] Appl. No.: 832,740

[22] Filed: Feb. 24, 1986

[51] Int. Cl.[4] .................. G02B 6/34

[52] U.S. Cl. .................. 350/96.19; 350/96.15

[58] Field of Search .................. 350/96.15, 96.19

[56] References Cited

U.S. PATENT DOCUMENTS

| | | | |
|---|---|---|---|
| 4,006,963 | 2/1977 | Baues et al. | 350/96.14 |
| 4,097,117 | 6/1978 | Neil et al. | 350/96.17 |
| 4,307,933 | 12/1981 | Palmer et al. | 350/96.16 |
| 4,317,614 | 3/1982 | Palmer | 350/96.16 |
| 4,387,954 | 6/1983 | Beasley | 350/96.15 |

FOREIGN PATENT DOCUMENTS

| | | | |
|---|---|---|---|
| 0004153 | 12/1979 | Japan | 350/96.15 |
| 0161201 | 12/1980 | Japan | 350/96.15 |
| 0163505 | 12/1980 | Japan | 350/96.15 |

OTHER PUBLICATIONS

Optics Letters, "Grating-Fiber Coupler as a High--Resolution Spectrometer", Russell et al., vol. 10, No. 6, Jun. 1985.

"Frequency Selective Coupler for Integrated Optic Systems" *Optics Communications*, vol. 7, No. 3; Mar. 1973, C. Elachi and C. Yeh, pp. 201-204.

"Contradirectional Frequency-Selective Couplers for Guided-Wave Optics" *Applied Optics*, vol. 19, No. 16; 15, Aug. 1980, P. Yeh and H. F. Taylor, pp. 2848-2855.

"An Analysis for Contradirectional-Coupler-Type Optical Grating Filters" *Journal of Lightwave Technology*, vol. LT-3, No. 4, Aug. 1985, N. Imoto, pp. 895-900.

*Primary Examiner*—Gene Wan

*Assistant Examiner*—James C. Lee

*Attorney, Agent, or Firm*—Gregory C. Ranieri

[57] ABSTRACT

Narrow band, wavelength selective optical coupling is achieved in a device including first and second optical transmission media and a filter. The first and second optical transmission media are in substantially close proximity of each other in a predetermined interaction region to provide evanescent coupling therebetween. The filter is positioned on the first optical transmission medium in the predetermined region for causing the coupling to be wavelength selective and contradirectional from the first optical transmission means to the second optical transmission means. One exemplary embodiment of the coupler includes optical fibers as the transmission media and a Bragg reflection grating integrally formed on the first transmission medium as the filter. Other embodiments include the use of semiconductor waveguides as the optical transmission media.

5 Claims, 1 Drawing Sheet

NARROW-BAND WAVELENGTH SELECTIVE OPTICAL COUPLER

TECHNICAL FIELD

This invention relates to the field of optical devices for coupling optical signals from one optical fiber to another.

BACKGROUND OF THE INVENTION

Optical fibers are being widely utilized in various communication systems such as local area networks, computer networks and standard subscriber loops. While optical fibers are capable of carrying a large amounts of information, the fibers lose their attractiveness unless there is some way to extract the information from the fiber for the end-user.

Couplers and, in particular, directional couplers have been developed exactly for this purpose. Directional couplers such as those described in U.S. Pat. Nos. 4,307,933, 4,317,614 and 4,431,260 include primary and secondary optical fibers each having polished flat surfaces in contact in the presence of an index matching fluid to accomplish evanescent directional coupling. In these couplers, optical signals are coupled from the primary fiber into the secondary fiber and the optical signals propagate in the secondary fiber in the same direction in which the signals travelled in the primary fiber. Also, the coupling is broadband in nature. That is, some percentage of each and every optical signal in the primary fiber are coupled into the secondary fiber regardless of mode or wavelength. Hence, directional couplers as described above lack wavelength selectivity which is necessary for applications such as multichannel wavelength division multiplexing and coherent communication systems.

Wavelength selective optical couplers have been predicted and described for embedded (side-by-side) channel waveguides devices by N. Imoto in *Jour. of Lightwave Tech.*, Vol. LT-3, No. 4, pp. 895 et seq. (1985). The couplers proposed therein are contradirectional because optical signals propagating in the primary waveguide at a particular narrow set of wavelengths are coupled to the secondary waveguide by a grating fiber to propagate in opposite (contrary) direction therein. It should be noted that Imoto stresses the importance of fabricating the grating filter over the secondary (output) waveguide to reduce undesired coupling between the embedded waveguides. While this type of coupler is applicable to the wavelength division multiplexing problem, it requires a complete change of transmission medium from fiber to embedded waveguide and then back to fiber and, in making those changes, it imposes significant insertion losses on the communication system as a whole.

SUMMARY OF THE INVENTION

In accordance with the principles of the present invention, it is possible to overcome the problems of the prior art while achieving narrow band, wavelength selective contradirectional coupling suitable for use in such applications as wavelength division multiplexing-/demultiplexing. The present invention includes first and second optical transmission media, and a filter disposed directly on the first optical transmission medium and positioned between the first and second optical transmission medium to cause coupling between both optical transmission media over a predetermined range including one or more wavelengths.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

Figure 1:
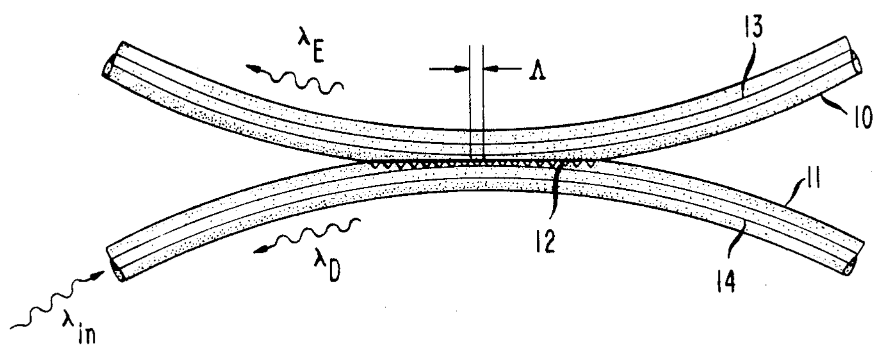
FIG. 1 shows one illustrative embodiment of the invention utilizing optical fibers as the transmission media and a grating-type filter.

Wavelength division multiplexing/demultiplexing systems require the use of wavelength selective devices to extract a predetermined wavelength or group of wavelengths from the primary transmission medium. The present invention is a narrow-band, wavelength selective optical coupler which is well suited for such an application.

In accordance with the general principles of the invention, the wavelength selective optical coupler is comprised of first and second optical transmission media, and a filter both disposed directly on the first optical transmission medium and positioned between the first and second optical transmission media. The first and second optical transmission media are preferably in close proximity to one another in at least the region containing the filter to enhance the filter operation of coupling a preselected wavelength optical signal in a substantially narrow band from the first optical transmission medium to the second optical transmission medium.

In the operation of this device, the optical signal $\lambda_{in}$ propagates in the first transmission medium toward the filter. When optical signal $\lambda_{in}$ interacts with the filter, optical signal $\lambda_E$ is coupled across to the second optical transmission medium in a direction opposite to optical signal $\lambda_{in}$. The filter is realized in a manner that it causes efficient coupling of optical signal $\lambda_E$ into the second optical transmission medium while keeping the back reflected optical signal $\lambda_D$ in the first optical transmission medium sufficiently separated in wavelength from the optical signal at $\lambda_E$.

Coupling between the transmission media is primarily evanescent in nature. By positioning the first optical transmission medium in close proximity to the second optical transmission medium, evanescent coupling is made possible. The narrow band filter then permits coupling of only a predetermined wavelength in the narrow bandwidth into the second optical transmission medium.

The first and second optical transmission media are realizable in various ways. Optical fibers, both multimode or both single mode or a combination of multimode and single mode, are one clear candidate for realizing the optical transmission media. Also, polarization maintaining fibers are can be used for one or both optical transmission media. An alternative approach is to employ semiconductor waveguides grown one atop the other.

For optical fibers, evanescent coupling is accomplished by standard techniques such as bending the fibers over a curved surface and creating a smooth flat surface on each fiber such that the flat surface extends to a sufficient depth through the cladding region to be near the core region. The coupling efficiency of a resulting coupler depends on the distance between the flat surface and the fiber core region. Details concerning the procedures and considerations for lapping optical fibers in preparation for making an evanescent coupler are provided by U.S. Pat. Nos. 4,307,933, 4,317,614 and 4,431,260.

Realizations of the filter may take several different forms. For example, diffraction gratings may be deposited on, placed in contact with, or formed integrally with the optical transmission medium. An integrally formed diffraction grating is preferable from a coupling efficiency standpoint because there is no boundary between the grating and the polished flat surface of the fiber in which the grating is formed and because the grating is in closer proximity to the fiber core region than for a deposited grating. The shape of the grating perturbations can be rectangular, sinusoidal, trapezoidal, sawtooth, triangular or the like and is chosen as a function of processing technique used to fabricate the grating. The period of the grating, $\Lambda$, and the effective interaction length determine the bandwidth of the filter response. The length of the grating is chosen to correspond to the length of the polished flat surface on the optical transmission media and is alternatively known as the interaction length.

It should be clear to those persons skilled in the art that the filter, especially a diffraction grating type of filter, introduces a matching between the first and second optical transmission media in the interaction region where both media are in close proximity. Hence, in all embodiments of the invention, it is preferred that the first optical transmission medium differs from the second optical transmission medium with respect to propagation constants or the corresponding effective refractive indices. In optical fibers, dissimilarity can be introduced by polishing identical fibers to different depths with respect to the core region, or by polishing different fibers to the same or differing depths, or by using fibers having differing index profiles, or by employing a dispersion shift in one fiber with respect to the other, or the like.

In an example from experimental practice, a narrowband, wavelength selective coupler is shown in FIG. 1 and is realized using optical fibers 10 and 11 as the optical transmission media and an integral Bragg reflection grating 12 as the filter.

Optical fibers 10 and 11 are single mode optical fibers having core regions 13 and 14, respectively. Each fiber is bent over an arcuate shape and polished to a flat surface to differing depths with respect to the core region resulting in differing effective refractive indices for the fibers in the interaction region where the fibers are in close proximity. The effective refractive index for optical fiber 11 (the input fiber for the coupler) is denoted $N_1$; the effective refractive index for optical fiber 10 (the output fiber for the coupler) is denoted $N_2$.

Bragg diffraction grating 12 having a grating period $\Lambda$ is formed in the interaction region of optical fiber 11 into the flat surface previously polished thereon. Using standard processing techniques, a thin layer of photoresist is deposited over the polished surface of optical fiber 11. A Bragg reflection grating mask is then written onto the photoresist by a standard holographic interference technique. Reactive ion etching is employed to produce the Bragg diffraction grating directly in the interaction region of optical fiber 11. In this example, the Bragg diffraction grating was etched approximately 800 Angstroms into the optical fiber with a grating period $\Lambda$ of 0.53 $\mu$m. to permit phase matching between optical fibers 10 and 11 at a center wavelength of 1.50 $\mu$m. as determined by the exchange Bragg condition $\lambda_E=(N_1+N_2)\Lambda$.

After fabrication of the Bragg reflection grating 12 is completed, the polished flat surface of optical fiber 10 is placed against the grating 12 in optical fiber 11.

In operation, an optical signal represented by $\lambda_{in}$ is launched into the input of the coupler, optical fiber 11. As the input optical signal interacts with the Bragg reflection grating 12, an exchange Bragg reflected optical signal at wavelength $\lambda_E$ is coupled into the output of the coupler along a contrary direction in optical fiber 10. Concurrently, a direct Bragg reflected optical signal at wavelength $\lambda_D=N_1\Lambda$ propagates in a contrary direction along optical fiber 11.

Figure 2:
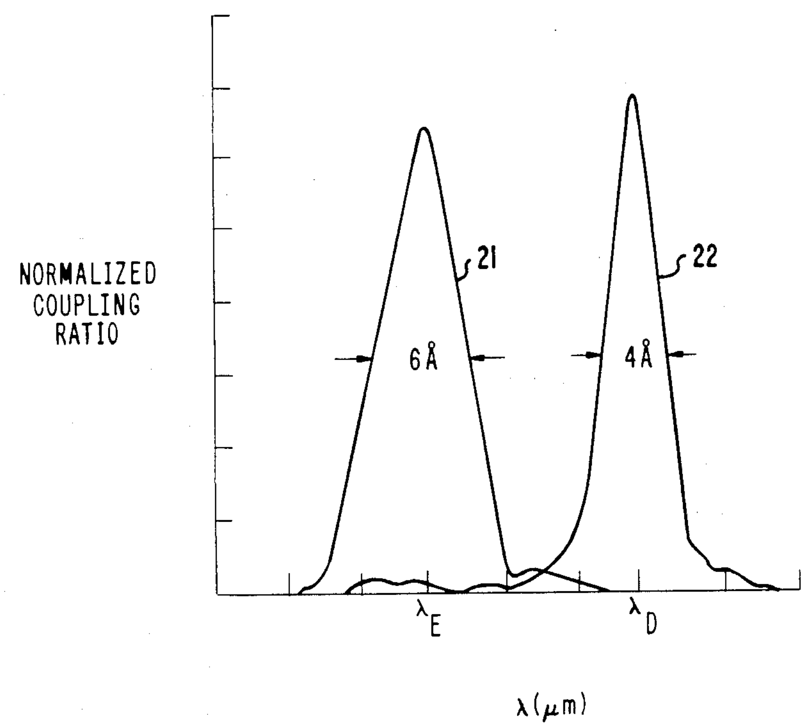
FIG. 2 is a graphical representation of the coupling ratio for the signals reflected and coupled by the filter for the embodiment shown in FIG. 1.

As shown in FIG. 2, under normal operating conditions the coupler exhibited a contradirectional coupling of 25% (curve 21) and a full wave half maximum of 6 Angstroms around the exchange Bragg reflected wavelength. The coupler also exhibited a direct Bragg reflected component at $\lambda_D$ with a 9% coupling ratio (curve 22 is plotted on a different scale than curve 21) and a full wave half maximum of 4 Angstroms.

Performance of the coupler in the interaction region is improved by utilizing an index matching fluid between the flat surface of optical fiber 10 and the Bragg reflection grating 12 in optical fiber 11.

What is claimed is:

1. An optical signal coupler comprises of first and second optical fibers, each fiber having a core region and a cladding region surrounding said core region, said first and second optical fibers being in substantially close proximity of each other in a predetermined region to provide evanescent coupling there between, the coupler being characterized by, filter means positioned solely in the cladding region of said first optical fiber in said predetermined region for causing said coupling to be wavelength selective for one wavelength of a plurality of wavelengths and contradirectional from the first optical fiber to the second optical fiber.

2. The coupler as defined in claim 1 further characterized in that the cladding region from each of said first and second optical fiber is at least partially removed in said predetermined region.

3. The coupler as defined in claim 2 further characterized in that the filter means is integral to said first optical fiber.

4. The coupler as defined in claim 3 further characterized in that the filter means includes a sequence of spatial perturbations along a direction of optical signal propagation in the first optical fiber.

5. The coupler as defined in claim 4 further characterized in that the sequence of spatial perturbations forms a Bragg reflection grating having a grating period between each perturbation.

* * * * *